United States Patent Office 3,138,531
Patented June 23, 1964

3,138,531
CANINE DISTEMPER VACCINE
Vincent Marshall, Omaha, Nebr., assignor to Eli Lilly and Company, Indianapolis, Ind., a corporation of Indiana
No Drawing. Filed July 12, 1961, Ser. No. 123,426
4 Claims. (Cl. 167—78)

The present invention relates to an improved canine distemper vaccine. More particularly, it relates to an attenuated-virus canine distemper vaccine of improved safety and antigenicity.

Distemper is a generalized disorder of dogs for which no successful therapeutic agent is known. The disease has so far been controlled only by preventive means, employing a vaccine of one type or another. Many such vaccines have been developed and employed, with varying degrees of effectiveness. The killed-virus vaccines are safe, but low in antigenicity, so that multiple inoculations are necessary for effective protection. Attenuated-virus vaccines are also well known, but in such vaccines it has been difficult to avoid one or the other of the contrasting problems of an attenuation level so severe as to result in low antigenicity and an attenuation level so mild as to cause active disease upon inoculation. Furthermore, the attenuated-virus vaccines, especially those produced by serial passage through chick embryo or other animal tissue, have commonly included extraneous materials damaging to the subject.

The present invention minimizes or avoids the shortcomings of the prior-art preparation by affording an attenuated vaccine of relatively high purity, antigenicity, and safety.

An object of the invention is to produce a canine distemper vaccine of improved properties.

Another object is to produce an attenuated-virus canine distemper vaccine having a minimum of tissue contaminants.

Another object is to produce substantially completely avirulent canine distemper vaccine.

A further object is to produce a canine distemper vaccine which provides earlier protection than any previous vaccine.

Other objects of the invention and its superiority over the prior art will be apparent from the following description.

In one aspect of the present invention, a vaccine is produced according to the following procedure: Virulent distemper virus is inoculated into a healthy dog. After the dog has developed clinical symptoms characteristic of canine distemper, it is sacrificed and the kidney tissues are removed and trypsinized. The infected cells released thereby are incubated at growth temperature (around 37° C.) for about five to ten days in a conventional growth medium such as Earle's solution until a monolayer tissue culture of dog kidney cells is obtained. At the end of the growth period, the culture is stressed by cooling around 10 to 20° C. below growth temperature, preferably to around ordinary room temperature (20–30 C.), where it is maintained for about one to about twenty hours or more, preferably around 6 to 12 hours. The supernatant liquid is then withdrawn, and is used to inoculate a new monolayer dog kidney tissue culture from a healthy dog, which is incubated and stressed according to the same procedure. Serial passage of the virus through normal monolayer dog kidney tissue cultures is thus continued for 25 or more passages, at the end of which time it is found that the virus is attenuated to such an extent as to be entirely avirulent. The resulting attenuated culture is used as seed for growing attenuated virus in quantity, using monolayer dog kidney tissue cultures for this purpose, and the attenuated virus is made into a vaccine by conventional methods, suitably by dilution with a stabilizing menstruum and freeze-drying.

In another aspect, the invention lies in an improved canine distemper vaccine, of high antigenicity and safety, prepared according to the procedure outlined above.

Thus, the invention involves adaptation of virulent canine distemper virus into monolayer dog kidney tissue culture followed by serial passage of the virus through a multiplicity of such cultures, with stressing of the culture at reduced temperature prior to harvesting each passage.

The following specific example is submitted for purpose of illustration only, and not by way of limitation. Numerous modifications and variations in the details thereof will readily occur to those skilled in the art.

EXAMPLE

*Tissue culture preparation.*—A healthy 6–12 week old dog is isolated at least two weeks, and is then sacrificed and exsanguinated. The kidneys are removed aseptically, minced into pieces 2 mm. or smaller in size, washed thoroughly in phosphate-buffered saline solution, and trypsinized. The resulting cell suspension is strained through a double layer of sterile cheese cloth, and the cells are sedimented by centrifuging at 1000 r.p.m. for five to eight minutes. The cells are washed twice with growth medium (10 percent bovine serum in Earle's lactalbumin), having the following composition:

| | |
|---|---|
| Phenol Red indicator | g 0.02 |
| Bovine serum | ml 100 |
| Lactalbumin (5 percent) | ml 100 |
| Earle's balanced salt solution | ml 800 | wherein the balanced salt solution has the following composition:

| | G. |
|---|---|
| NaCl | 6.8 |
| KCl | 0.4 |
| $MgSO_4 \cdot 7H_2O$ | 0.205 |
| $NaH_2PO_4 \cdot H_2O$ | 0.144 |
| Glucose | 1.000 |
| $NaHCO_3$ | 2.200 |
| $CaCl_2$ | 0.265 |

Water to make 1000 ml.

The cells are then centrifuged, suspended in growth medium, seeded into tissue culture flasks, and permitted to grow from two to four days at 37° C., during which time a monolayer tissue culture forms on the walls of the flasks. The flasks are then emptied and refilled to their original level with maintenance medium, having the following composition:

| | Vol. percent |
|---|---|
| Horse serum | 2 |
| Lactalbumin (5 percent) | 10 |
| Earle's balanced salt solution | 88 |

*Inoculum.*—A healthy 6–12 week old dog is isolated at least two weeks, and is inoculated intravenously with a virulent Snyder-Hill strain of canine distemper virus, obtained from the Veterinary Virus Institute of Cornell University as the 36th dog passage. By the end of 11 days, the dog becomes acutely ill and shows the clinical symptoms characteristic of canine distemper. The dog is sacrificed and exsanguinated, and its kidneys are removed, minced, and trypsinized. The resulting cell suspension is centrifuged. The cells are washed, resuspended in growth medium, and transferred to tissue culture flasks. The flasks are incubated at growth temperature (about 37° C.) for about five days, during which time a monolayer kidney tissue culture forms in each of the flasks, together with an abundant growth of the canine distemper virus in both the tissue culture and the supernatant liquid.

*Attenuation.*—The supernatant liquid is poured off and inoculated into healthy monolayer kidney tissue cultures in maintenance medium, prepared as described above, at a dosage of one milliliter per flask. The flasks are incubated at growth temperature (about 37° C.) for about five days, at the end of which time the cultures are stressed by cooling the flasks to the range of about 20–30° C. and holding at this temperature for about 12 hours. The supernatant liquid is then poured off and used as seed in fresh flasks of healthy dog kidney monolayer tissue culture at a dosage of around one milliliter per flask, after which the flasks are incubated, then stressed at reduced temperature, in the same way. The virus is passaged serially in this manner through a series of 48 passages in order to reach the desired degree of attenuation.

The early passages of the virus through the tissue culture result in little changes in the cell sheet of the infected culture. By the seventh passage, definite tissue cytopathogenic effects can be observed if the incubation of a flask is continued for eleven days; but it is not until after the fifteenth passage that a tissue cytopathogenic effect characteristic of canine distemper is clearly observable in all cultures. By the forty-eighth passage, the tissue cytopathogenic effect is regularly discernible by the fifth day of incubation.

The virulence of the virus is observed to decrease rapidly with serial passage in the monolayer tissue cultures. The second-passage virus, when inoculated intramuscularly in undiluted form, causes all susceptible dogs to become ill, and kills a great majority. By the twelfth passage, only around 25 percent of the test dogs show typical distemper symtoms. At the twenty-fifth passage, no distemper or other pathological symptoms are caused by the virus, and the dogs are found to be immune serologically and protected against intracranial virulent virus challenge at 21 days. After 48 passages, dogs are completely protected by inoculation with the virus at 1:1000 dilution and partially at 1:10,000 dilution. Furthermore, the attenuated virus does not cause illness in any susceptible dogs when inoculated intravenously, intracerebrally, intraoculary, intramuscularly, or subcutaneously.

*Vaccine seed.*—Seed for vaccine production is obtained by removing the supernatant liquid from flasks at the forty-eighth passage through dog kidney monolayer tissue culture. The seed virus is harvested after 48 to 96 hours of incubation, and is stored at temperatures between −50 and −70° C. in tightly sealed bottles containing 25 to 150 ml. It is not strained or centrifuged before storage or use.

*Vaccine production.*—Vaccine is produced in 5-liter pretoxin flasks of dog kidney monolayer tissue culture, prepared as described above. The flasks are seeded with a mixture of one part of seed virus to between 10 and 100 parts of maintenance medium, each flask receiving around 250 ml. of this mixture. The flasks are incubated at 37° C. for several days, after which the supernatant liquid is harvested and stored under refrigeration.

The attenuated virus is composited, centrifuged, and mixed with a menstruum of conventional type for freeze-drying. The mixture is filled under aseptic conditions into product vials, and is freeze-dried in a conventional manner. The vials of dried vaccine are sealed and provided with a crimped aluminum cover of conventional design.

*Tests.*—The dried product is tested for sterility, potency, and safety, employing conventional procedures for these purposes.

I claim:
1. In a method for producing a canine distemper vaccine of improved safety and effectiveness, the steps which comprise serially passaging a canine distemper virus through monolayer dog kidney tissue culture, each passage comprising an incubation period at growth temperature around 37° C. followed by an incubation period at a temperature from about 10 to about 20° C. below growth temperature, the supernatant fluid being harvested after each passage and employed as seed in the subsequent passage, and continuing such serial passages until said virus becomes attenuated to avirulent condition.

2. In a method for producing a canine distemper vaccine of improved safety and effectiveness, the steps which comprise adapting a virulent canine distemper virus into monolayer dog kidney tissue culture, serially passaging said virus through monolayer dog kidney tissue culture, each passage comprising a growth incubation period at growth temperature around 37° C. followed by a stressing incubation period at a temperature from about 10 to about 20° C. below growth temperature, the supernatant fluid being harvested after each passage and employed as seed in the subsequent passage, and continuing such serial passages until said virus becomes attenuated to avirulent condition.

3. In a method for producing a canine distemper vaccine of improved safety and effectiveness, the steps which comprise adapting a virulent canine distemper virus into monolayer dog kidney tissue culture, serially passaging said virus through monolayer dog kidney tissue culture, each passage comprising a growth incubation period at growth temperature around 37° C. for about five to about ten days, followed by a stressing incubation period at a temperature between about 20 and about 30° C. for about 1 to about 20 hours, the supernatant fluid being harvested after each passage and employed as seed in the subsequent passage, continuing such serial passage for at least about 25 passages until said virus becomes attenuated to avirulent condition, and harvesting the attenuated virus.

4. In a method for producing a canine distemper vaccine of improved safety and effectiveness, the steps which comprise adapting a virulent canine distemper virus into monolayer dog kidney tissue culture, serially passaging said virus through monolayer dog kidney tissue culture, each passage comprising a growth incubation period at growth temperature around 37° C. for about five to about ten days, followed by a stressing incubation period at a temperature between about 20 and about 30° C. for about 6 to about 12 hours, the supernatant fluid being harvested after each passage and employed as seed in the subsequent passage, continuing such serial passage for at least about 25 passages until said virus becomes attenuated to avirulent condition, and harvesting the attenuated virus.

References Cited in the file of this patent

UNITED STATES PATENTS

| 2,720,484 | Meadows et al. | Oct. 11, 1955 |
| 2,912,361 | Froelich | Nov. 10, 1959 |
| 2,965,544 | Cabasso | Dec. 20, 1960 |

OTHER REFERENCES

Vantis: "Preliminary Note on the Propagation of Canine Distemper Virus in Different Tissue-Culture Systems," Veterinary Record, vol. 71, No. 5, pp. 99–100, Jan. 31, 1959.

Rockborn: "An Attenuated Strain of Canine Distemper Virus in Tissue Culture," Nature, vol. 184, page 822, Sept. 12, 1959.

Cabasso: "Contributions of Tissue Culture to Canine Hepatitis and Distemper Vaccination," Journal A.V.M.A., vol. 136, No. 1, Jan. 1, 1960, pp. 1–8.

Prier: "Live Virus Immunizing Agents," J. Am. Vet. Med. Ass'n., vol. 137, No. 10, Nov. 15, 1960, pp. 577–584.